United States Patent
Raanan et al.

(10) Patent No.: US 9,378,210 B2
(45) Date of Patent: Jun. 28, 2016

(54) MANAGING THE WRITING OF A DATASET TO A DATA STORAGE DEVICE

(71) Applicant: HAPPY CLOUD INC., Cambridge, MA (US)

(72) Inventors: Gavriel Raanan, Beit Shemesh (IL); Lawrence Reisler, Beit Shemesh (IL)

(73) Assignee: HAPPY CLOUD INC., Cambridge, MA (US)

( * ) Notice: Subject to any disclaimer, the term of this patent is extended or adjusted under 35 U.S.C. 154(b) by 197 days.

(21) Appl. No.: 13/932,038

(22) Filed: Jul. 1, 2013

(65) Prior Publication Data

US 2014/0006462 A1    Jan. 2, 2014

Related U.S. Application Data

(60) Provisional application No. 61/665,911, filed on Jun. 29, 2012.

(51) Int. Cl.
  *G06F 17/30* (2006.01)
  *G06F 9/445* (2006.01)

(52) U.S. Cl.
  CPC .............. *G06F 17/3007* (2013.01); *G06F 8/65* (2013.01); *G06F 17/30168* (2013.01)

(58) Field of Classification Search
  USPC ......... 707/821, 822, 758, 802, 812, 809, 825; 711/161; 717/175
  See application file for complete search history.

(56) References Cited

U.S. PATENT DOCUMENTS

| | | | |
|---|---|---|---|
| 6,356,983 B1 * | 3/2002 | Parks | 711/145 |
| 8,301,856 B2 * | 10/2012 | Grisenthwaite | 711/163 |
| 8,504,736 B2 * | 8/2013 | Thaler et al. | 710/5 |
| 8,615,740 B2 * | 12/2013 | Thompson | 717/124 |
| 2004/0153718 A1 * | 8/2004 | Shen | G06F 11/2087 714/5.11 |
| 2006/0288341 A1 * | 12/2006 | Wurden et al. | 717/168 |
| 2008/0083030 A1 * | 4/2008 | Durham et al. | 726/22 |
| 2009/0150872 A1 | 6/2009 | Russell | |
| 2010/0146481 A1 * | 6/2010 | Binder et al. | 717/110 |
| 2010/0250908 A1 | 9/2010 | Amann | |
| 2011/0202739 A1 | 8/2011 | Grisenthwaite | |
| 2011/0225576 A1 * | 9/2011 | Guedalia et al. | 717/175 |
| 2012/0102480 A1 * | 4/2012 | Hopmann et al. | 717/172 |

FOREIGN PATENT DOCUMENTS

| | | |
|---|---|---|
| EP | 1450258 | 8/2004 |
| EP | 1450258 A2 * | 8/2004 |
| WO | WO 00/04467 | 1/2000 |
| WO | WO 0004467 A1 * | 1/2000 |

* cited by examiner

*Primary Examiner* — Amresh Singh
(74) *Attorney, Agent, or Firm* — Daniel J. Swirsky; AlphaPatent Associates Ltd.

(57) ABSTRACT

Managing the writing of a dataset by initiating a first computer-implemented process to write a plurality of portions of a dataset to a corresponding plurality of data storage locations on at least one data storage device, identifying a request made by a second computer-implemented process to write data to one of the data storage locations before the first computer-implemented process has finished writing all of the portions of the dataset to all of the data storage locations, and excluding the data storage location associated with the request from future writes by the first computer-implemented process of any portion of the dataset.

14 Claims, 2 Drawing Sheets

MANAGING THE WRITING OF A DATASET TO A DATA STORAGE DEVICE

CROSS-REFERENCE TO RELATED APPLICATIONS

This application claims the benefit of U.S. Provisional Patent Application No. 61/665,911, filed Jun. 29, 2012, which is incorporated herein by reference in its entirety.

FIELD OF THE INVENTION

The present inventions relates generally to data storage techniques.

BACKGROUND OF THE INVENTION

Under certain circumstances a computer application may be in the middle of downloading to a computer a large set of data files of a computer application when critical updates to portions of some of the files become available for download. If an independent process downloads the updates concurrently with the download of the data files, and both are stored to the same data storage devices, there is a risk that an update will be overwritten with pre-update data.

SUMMARY OF THE INVENTION

In one aspect of the invention a method is provided for managing the writing of a dataset, the method including initiating a first computer-implemented process to write a plurality of portions of a dataset to a corresponding plurality of data storage locations on at least one data storage device, identifying a request made by a second computer-implemented process to write data to one of the data storage locations before the first computer-implemented process has finished writing all of the portions of the dataset to all of the data storage locations, and excluding the data storage location associated with the request from future writes by the first computer-implemented process of any portion of the dataset.

In another aspect of the invention the method further includes downloading the portions of the dataset via a computer network.

In another aspect of the invention the dataset includes executable files and data files associated with a computer-based application.

In another aspect of the invention the method further includes reserving, in advance of writing any portion of the dataset, all of the data storage locations that are required to accommodate the writing of the dataset to the data storage devices.

In another aspect of the invention the identifying includes identifying the second computer-implemented process as a patching process.

In another aspect of the invention the identifying includes identifying the second computer-implemented process as a patching process by detecting at least one of the following a) when the second computer-implemented process requests to open a file with write access, where the file is located within the data storage locations to which the dataset is being written, b) when the second computer-implemented process requests to write to a file, where the file is located within data storage locations to which dataset is being written, and c) when the second computer-implemented process notifies the first computer-implemented process that a patching process has begun.

In another aspect of the invention the method further includes maintaining in a list of protected data storage locations the location of any of the data storage location that is the subject of a write request the by the second computer-implemented process.

In another aspect of the invention the method further includes checking the list of protected data storage locations before writing any of the portions of the dataset to a selected location among any of the data storage locations to determine whether or not the selected location is included in the list, and writing to the selected location only if the selected location is absent from the list of protected data storage locations.

In another aspect of the invention any of a) computer hardware and b) computer software embodied in a non-transitory, computer-readable medium are configured to perform the initiating, identifying, and excluding.

In another aspect of the invention a system is provided for managing the writing of a dataset, the system including a dataset writer configured to write a plurality of portions of a dataset to a corresponding plurality of data storage locations on at least one data storage device, and a conflict monitor configured to identify a request made by a second computer-implemented process to write data to one of the data storage locations before the first computer-implemented process has finished writing all of the portions of the dataset to all of the data storage locations, and exclude the data storage location associated with the request from future writes by the first computer-implemented process of any portion of the dataset.

In another aspect of the invention the portions of the dataset are downloaded via a computer network.

In another aspect of the invention the dataset includes executable files and data files associated with a computer-based application.

In another aspect of the invention the dataset writer is configured to reserve, in advance of writing any portion of the dataset, all of the data storage locations that are required to accommodate the writing of the dataset to the data storage devices.

In another aspect of the invention the second computer-implemented process is configured to apply a dataset patch containing updated portions of the dataset by writing the updated portions to any of the data storage locations.

In another aspect of the invention the conflict monitor is configured to maintain in a list of protected data storage locations the location of any of the data storage location that is the subject of a write request the by the second computer-implemented process.

In another aspect of the invention the dataset writer is configured to check the list of protected data storage locations before writing any of the portions of the dataset to a selected location among any of the data storage locations to determine whether or not the selected location is included in the list, and write to the selected location only if the selected location is absent from the list of protected data storage locations.

In another aspect of the invention the dataset writer and the conflict monitor are embodied in any of a) computer hardware and b) computer software embodied in a non-transitory, computer-readable medium.

In another aspect of the invention a computer program product is provided for managing the writing of a dataset, the computer program product including a non-transitory, computer-readable storage medium, and computer-readable program code embodied in the computer-readable storage medium, where the computer-readable program code is configured to initiate a first computer-implemented process to write a plurality of portions of a dataset to a corresponding plurality of data storage locations on at least one data storage device, identify a request made by a second computer-implemented process to write data to one of the data storage locations before the first computer-implemented process has finished writing all of the portions of the dataset to all of the data storage locations, and exclude the data storage location associated with the request from future writes by the first computer-implemented process of any portion of the dataset.

In another aspect of the invention the computer-readable program code is configured to reserve, in advance of writing any portion of the dataset, all of the data storage locations that are required to accommodate the writing of the dataset to the data storage devices.

In another aspect of the invention the computer-readable program code is configured to maintain in a list of protected data storage locations the location of any of the data storage locations that is the subject of a write request by the second computer-implemented process, check the list of protected data storage locations before writing any of the portions of the dataset to a selected location among any of the data storage locations to determine whether or not the selected location is included in the list, and write to the selected location only if the selected location is absent from the list of protected data storage locations.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
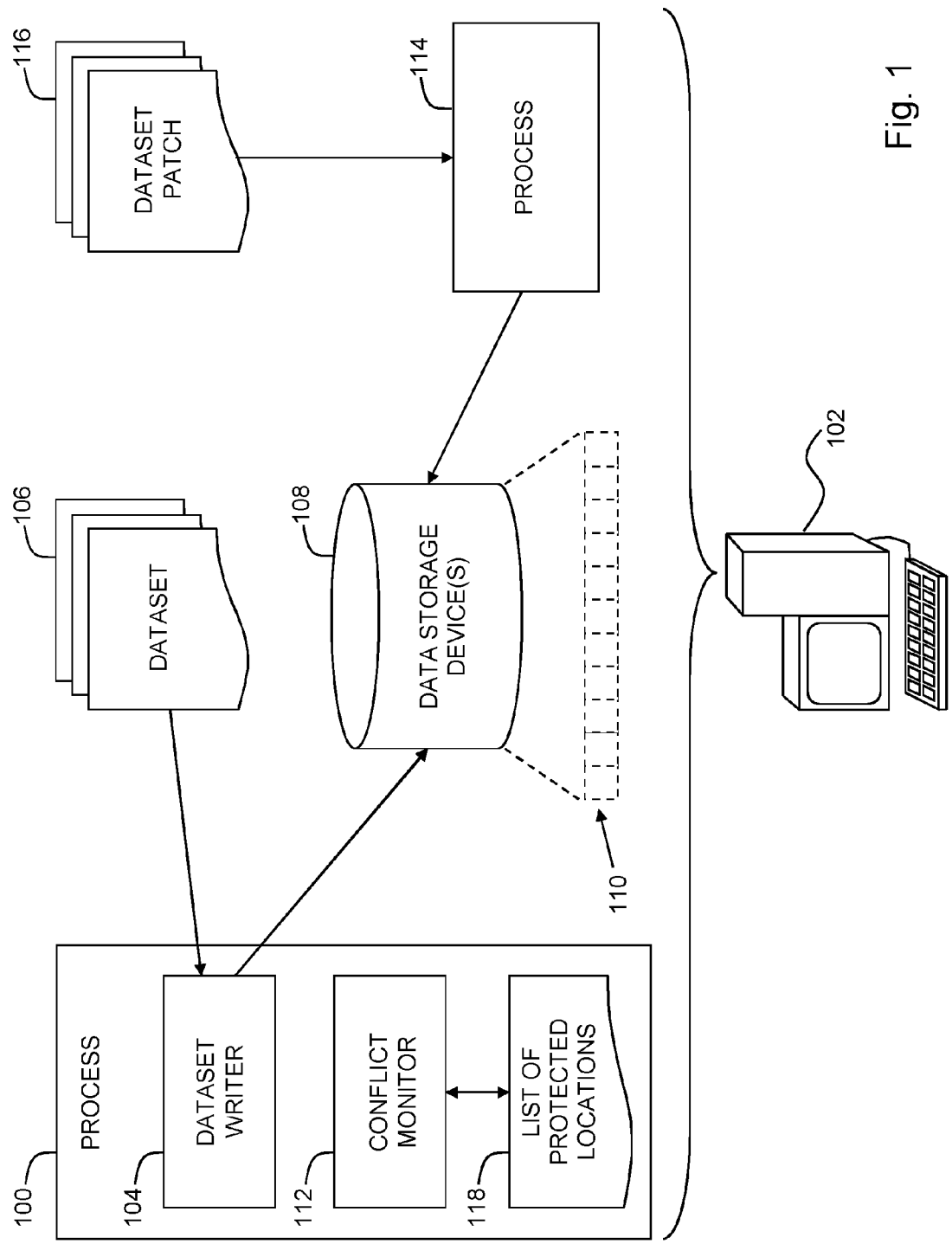
FIG. 1 is a simplified conceptual illustration of a system for managing the writing of a dataset to a data storage device, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for managing the writing of a dataset to a data storage device, constructed and operative in accordance with an embodiment of the invention. In the system of FIG. 1, a computer-implemented process 100 is initiated, such as where process 100 is executed by a computer 102. Process 100 preferably includes a dataset writer 104 that is configured to write a dataset 106 to one or more data storage devices 108, such as where the various portions of dataset 106 are downloaded via a computer network and then written to corresponding data storage locations 110 on data storage devices 108. Dataset 106 may, for example, be a collection of the files, such as executable files and data files, that make up a computer-based application, such as a role-playing game. Preferably, all of the data storage locations 110 that are required to accommodate the writing of dataset 106 to data storage devices 108 are reserved in advance by dataset writer 104 once the storage requirements of dataset 106, such as its file names and sizes, become known to dataset writer 104, such that even before dataset writer 104 downloads a given portion of dataset 106 the portion is already associated with a particular data storage location 110 to which the portion is to be written.

Process 100 also preferably includes a conflict monitor 112 that is configured to identify requests made by other computer-implemented processes, such as by a computer-implemented process 114, to write data to one of the data storage locations 110 on data storage devices 108 before dataset writer 104 has finished writing all of the portions of dataset 106 to all of the data storage locations 110. For example, process 114 may be responsible for applying a dataset patch 116 containing updated portions of dataset 106 by writing the updated portions to data storage locations 110.

Conflict monitor 112 is also preferably configured to exclude any of the data storage locations 110 that are associated with such write requests by other processes from future writes by dataset writer 104 of any portion of dataset 106. For example, conflict monitor 112 may maintain a list 118 of protected data storage locations 110, where conflict monitor 112 indicates in list 118 the location of any data storage location 110 that is the subject of a write request by a computer-implemented process other than process 100. Dataset writer 104 is preferably configured to check list 118 before writing a portion of dataset 106 to a data storage location 110 to see whether or not the data storage location is included in list 118. If the data storage location is included in list 118, then dataset writer 104 does not write the portion of dataset 106 to the data storage location. If the data storage location is not included in list 118, then dataset writer 104 writes the portion of dataset 106 to the data storage location.

Any of the elements shown in FIG. 1 are preferably implemented by one or more computers, such as by computer 102, in computer hardware and/or in computer software embodied in a non-transitory, computer-readable medium in accordance with conventional techniques.

Figure 2:
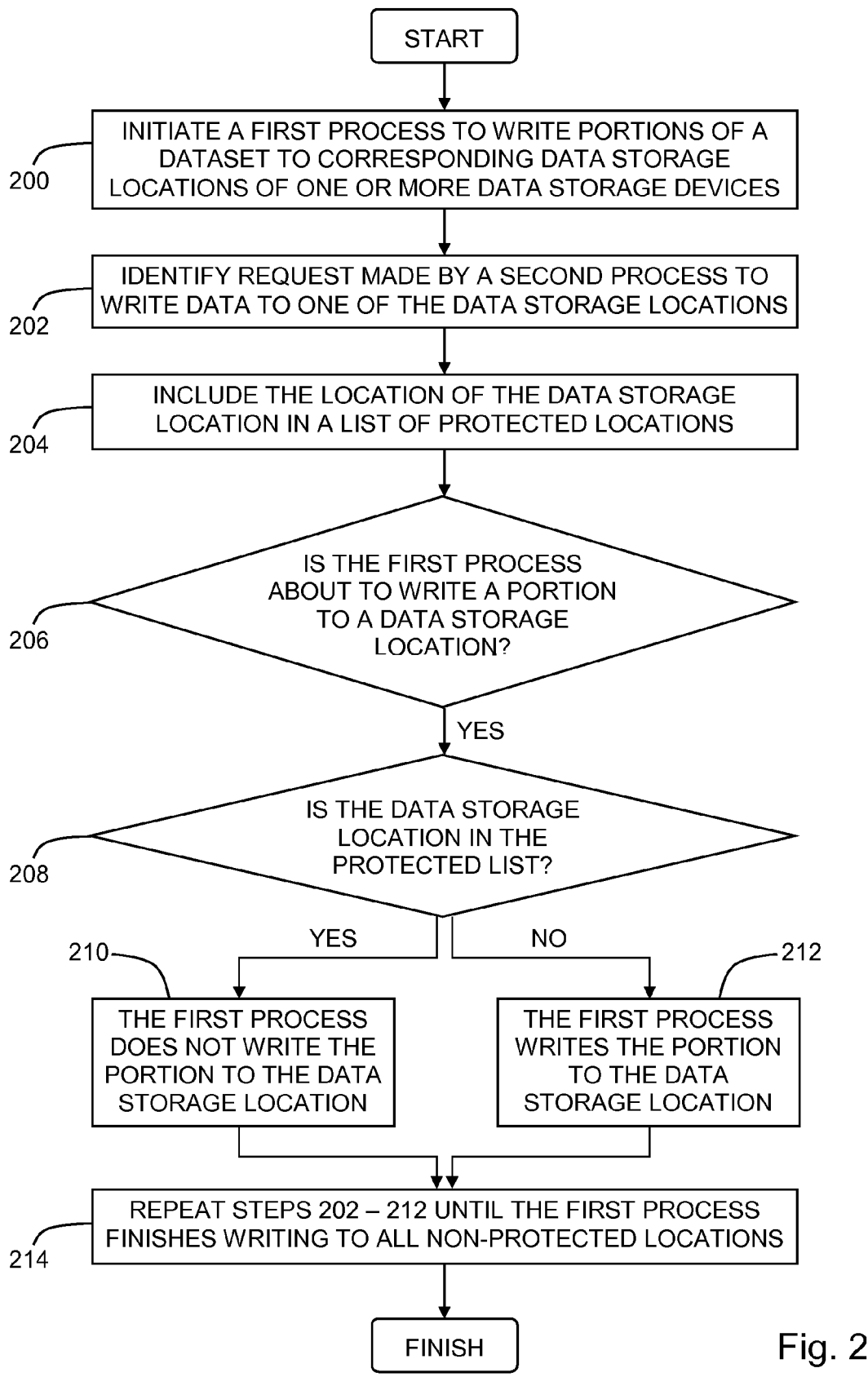
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2 a first computer-implemented process is initiated to write portions of a dataset to corresponding data storage locations of one or more data storage devices (step 200). At any time during the operation of the first process, a request made by a second computer-implemented process to write data to one of the data storage locations is identified (step 202) and the location of the data storage location is included in a list of protected locations (step 204). When the first process is about to write a portion of the dataset to one of the data storage locations (step 206), the list of protected locations is checked to determine whether or not the data storage location is included in the list (step 208). If the data storage location is included in the list, the first process does not write the portion of the dataset to the data storage location (step 210). If the data storage location is not included in list, the first process writes the portion of the dataset to the data storage location (step 212). Steps 202-212 are preferably repeated until all of the data storage locations associated with the dataset are included in the protected list, or until the first process has written all of the portions of the dataset to the data storage locations save those portions that were to be written to data storage locations included in the list of protected locations (step 214).

The system of FIG. 1 and method of FIG. 2 may, for example, be employed by the system described in U.S. patent application Ser. No. 13/043,532 (hereinafter "'532"), in which a computer user is able to begin to play a computer game on a computer before all of the executable files and data files of the dataset that make up the game are downloaded to the user's computer from a computer server via a computer network. In '532 a computer-implemented manager process that is executed by the user's computer downloads an initial portion of a dataset of the computer game to the user's local data storage device, where the initial portion was predetermined to be enough of the game's dataset to allow the game to be started. During game play the manager process continues to download additional portions of the dataset to the user's local data storage device in one or more background processes, while a computer-implemented interceptor process intercepts requests for data made by the game itself to ensure that requested data are present on the user's local data storage device.

The system of FIG. 1 and method of FIG. 2 may be employed by the '532 system in the event that the game initiates a patching process during which time the game itself attempts to download updates to portions of the game's dataset and write the updated portions to the same data storage locations on the user's local data storage device where the manager process is currently writing portions of the dataset that have not yet been updated. In this scenario the system of FIG. 1 and method of FIG. 2 may be employed whereby the manager process, representing process 100, writes non-updated portions of the dataset to data storage locations on the user's local data storage device while avoiding overwriting data storage locations that are written to by the patching process, representing process 114.

The start of the patching process may be detected using any conventional technique, such as by detecting any, or any combination of, the following:
  when a process requests to open a file with write access, where the file is located within data storage locations 110 to which dataset 106 is being written;
  when a process requests to write to a file, where the file is located within data storage locations 110 to which dataset 106 is being written;

when a process notifies process 100 that a patching process has begun, such as by sending a direct signal, such as via a socket, a named pipe, or other means, to process 100 using a published API.

When the start of the patching process has been detected, process 100 preferably suspends all background downloading threads related to downloading dataset 106 via a computer network and writing dataset 106 to data storage locations 110 go to sleep as soon as they complete any request currently in service. This is to free up download bandwidth and disk access for use by the patching process. However, any foreground downloading threads related to requests by the game for parts of dataset 106 that have not yet been downloaded are preferably allowed to continue during the patching process.

The end of the patching process may be detected using any conventional technique, such as by detecting any, or any combination of, the following:
- when all file handles opened with write access by the patching process are closed;
- when the patching process terminates or initiates a separate process (e.g., restarts the game);
- when no writes by the patching process have occurred for a predefined amount of time to files located within data storage locations 110 to which dataset 106 is being written.

When the end of the patching process has been detected, process 100 preferably allows background downloading threads related to downloading dataset 106 via a computer network and writing dataset 106 to data storage locations 110 to resume.

Preferably, conventional techniques are employed to preserve list 118 of protected data storage locations 110 in the event of a system reboot before all of dataset 106 is written to data storage locations 110. Additionally, given that the '532 system already describes the use of a separate mapping of data storage locations 110 that indicates which portions of data storage locations 110 have been written to, list 118 may be incorporated into such a mapping, such as upon recovery from such a reboot, provided that the combined mapping preserves the functionality of list 118 as described hereinabove.

It is appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the drawing figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for managing the writing of a dataset, the method comprising:
    initiating a first computer-implemented process to write a plurality of portions of a dataset to a corresponding plurality of data storage locations on at least one data storage device;
    identifying a request made by a second computer-implemented process to write data to one of the data storage locations before the first computer-implemented process has finished writing all of the portions of the dataset to all of the data storage locations; and
    excluding the data storage location associated with the request from future writes by the first computer-implemented process of any portion of the dataset by
        maintaining in a list of protected data storage locations the location of any of the data storage locations that is the subject of a write request by the second computer-implemented process,
        checking the list of protected data storage locations before writing any of the portions of the dataset to a selected location among any of the data storage locations to determine whether or not the selected location is included in the list, and writing to the selected location only if the selected location is absent from the list of protected data storage locations.

2. The method according to claim 1 and further comprising downloading the portions of the dataset via a computer network.

3. The method according to claim 1 wherein the dataset includes executable files and data files associated with a computer-based application.

4. The method according to claim 1 and further comprising reserving, in advance of writing any portion of the dataset, all of the data storage locations that are required to accommodate the writing of the dataset to the data storage devices.

5. The method according to claim 1 wherein the identifying comprises identifying the second computer-implemented process as a patching process.

6. The method according to claim 1 wherein the identifying comprises identifying the second computer-implemented process as a patching process by detecting at least one of the following:
   a) when the second computer-implemented process requests to open a file with write access, where the file is located within the data storage locations to which the dataset is being written,
   b) when the second computer-implemented process requests to write to a file, where the file is located within data storage locations to which dataset is being written, and
   c) when the second computer-implemented process notifies the first computer-implemented process that a patching process has begun.

7. The method according to claim 1 wherein any of
   a) computer hardware and
   b) computer software embodied in a non-transitory, computer-readable medium
   are configured to perform the initiating, identifying, and excluding.

8. A system for managing the writing of a dataset, the system comprising:
   a dataset writer configured to write a plurality of portions of a dataset to a corresponding plurality of data storage locations on at least one data storage device; and
   a conflict monitor configured to
      identify a request made by a second computer-implemented process to write data to one of the data storage locations before the first computer-implemented process has finished writing all of the portions of the dataset to all of the data storage locations, and
      exclude the data storage location associated with the request from future writes by the first computer-implemented process of any portion of the dataset,
   wherein the conflict monitor is configured to maintain in a list of protected data storage locations the location of any of the data storage locations that is the subject of a write request by the second computer-implemented process,
   wherein the dataset writer is configured to
      check the list of protected data storage locations before writing any of the portions of the dataset to a selected location among any of the data storage locations to determine whether or not the selected location is included in the list, and
      write to the selected location only if the selected location is absent from the list of protected data storage locations, and
   wherein the dataset writer and the conflict monitor are embodied in any of
      a) computer hardware and
      b) computer software embodied in a non-transitory, computer-readable medium.

9. The system according to claim 8 wherein the portions of the dataset are downloaded via a computer network.

10. The system according to claim 8 wherein the dataset includes executable files and data files associated with a computer-based application.

11. The system according to claim 8 wherein the dataset writer is configured to reserve, in advance of writing any portion of the dataset, all of the data storage locations that are required to accommodate the writing of the dataset to the data storage devices.

12. The system according to claim 8 wherein the second computer-implemented process is configured to apply a dataset patch containing updated portions of the dataset by writing the updated portions to any of the data storage locations.

13. A computer program product for managing the writing of a dataset, the computer program product comprising:
   a non-transitory, computer-readable storage medium, and
   computer-readable program code embodied in the computer-readable storage medium, wherein the computer-readable program code is configured to
      initiate a first computer-implemented process to write a plurality of portions of a dataset to a corresponding plurality of data storage locations on at least one data storage device,
      identify a request made by a second computer-implemented process to write data to one of the data storage locations before the first computer-implemented process has finished writing all of the portions of the dataset to all of the data storage locations, and
      exclude the data storage location associated with the request from future writes by the first computer-implemented process of any portion of the dataset by
         maintaining in a list of protected data storage locations the location of any of the data storage locations that is the subject of a write request by the second computer-implemented process,
         checking the list of protected data storage locations before writing any of the portions of the dataset to a selected location among any of the data storage locations to determine whether or not the selected location is included in the list, and
         writing to the selected location only if the selected location is absent from the list of protected data storage locations.

14. The computer program product according to claim 13 wherein the computer-readable program code is configured to reserve, in advance of writing any portion of the dataset, all of the data storage locations that are required to accommodate the writing of the dataset to the data storage devices.

* * * * *